(12) United States Patent
Lee et al.

(10) Patent No.: US 8,588,120 B2
(45) Date of Patent: Nov. 19, 2013

(54) POWER CONSERVATION IN WIRELESS CLIENT TERMINALS USING PROXY DEVICE

(75) Inventors: Jangwon Lee, San Diego, CA (US); Olufunmilola O. Awoniyi, San Diego, CA (US); Soumya Das, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 12/883,489

(22) Filed: Sep. 16, 2010

(65) Prior Publication Data

US 2012/0069827 A1 Mar. 22, 2012

(51) Int. Cl.
 *G08C 17/00* (2006.01)
(52) U.S. Cl.
 USPC ............ 370/311; 370/315; 370/338; 370/352
(58) Field of Classification Search
 None
 See application file for complete search history.

(56) References Cited

U.S. PATENT DOCUMENTS

| | | | |
|---|---|---|---|
| 2003/0198196 A1* | 10/2003 | Bahl et al. ..................... 370/311 |
| 2004/0128310 A1 | 7/2004 | Zmudzinski et al. |
| 2005/0282494 A1* | 12/2005 | Kossi et al. .................. 455/41.2 |
| 2006/0087993 A1* | 4/2006 | Sengupta et al. ............. 370/310 |
| 2007/0264955 A1* | 11/2007 | Tsai et al. ................... 455/186.1 |
| 2008/0176568 A1* | 7/2008 | Palanki et al. ................ 455/436 |
| 2009/0219844 A1* | 9/2009 | Soliman ........................ 370/311 |
| 2009/0221261 A1* | 9/2009 | Soliman ...................... 455/343.2 |
| 2009/0221303 A1* | 9/2009 | Soliman ........................ 455/458 |
| 2010/0062760 A1* | 3/2010 | Fuccellaro et al. ......... 455/426.1 |
| 2012/0052814 A1* | 3/2012 | Gerber et al. .............. 455/67.11 |

FOREIGN PATENT DOCUMENTS

| | | |
|---|---|---|
| EP | 2048908 A1 | 4/2009 |
| JP | 2007096988 A | 4/2007 |
| WO | WO9715154 A1 | 4/1997 |
| WO | 2006047778 A1 | 5/2006 |

OTHER PUBLICATIONS

International Search Report and Written Opinion—PCT/US2011/051738—ISA/EPO—Jan. 11, 2012.

* cited by examiner

*Primary Examiner* — Gregory Sefcheck
*Assistant Examiner* — Jenkey Van
(74) *Attorney, Agent, or Firm* — Charles Chesney

(57) ABSTRACT

A novel power conservation scheme is provided for conserving power in client terminals by using a proxy server. The client terminal may have a secondary communication interface for short range communications and a primary communication interface for long range communications with an access point for a wireless network. To conserve power, the client terminal may power down its primary communication interface without informing the access point. The access point assumes the primary communication interface is still active. Prior to shutting off its primary communication interface, the client terminal may assign an external proxy device to act as a proxy and monitor its data channel with the access point. The proxy device monitors the data channel(s) for the client terminal via a primary communication interface. If the proxy device detects a data message for the client terminal, it forwards the data message to the client terminal via a secondary communication interface.

50 Claims, 8 Drawing Sheets

POWER CONSERVATION IN WIRELESS CLIENT TERMINALS USING PROXY DEVICE

BACKGROUND

1. Field

Various features pertain to wireless communication systems. At least one feature pertains to devices and methods for facilitating power conservation in a wireless client terminal by using a proxy device to receive and forward data to the client terminal via a secondary wireless interface.

2. Background

Client terminals, such as laptop computers, personal digital assistant devices, mobile or cellular phones, or any other device with a processor, that communicate with other devices through wireless signals are becoming increasingly popular. Client terminals are typically battery-powered and the amount of power a battery can provide is limited. With consumers using power-intensive applications that run on the client terminals, particularly entertainment media and imaging applications, conserving battery power is important.

Client terminals may operate in one of several modes depending on the communication standard being implemented in a wireless network. For example, Wideband Code Division Multiple Access (WCDMA) includes various types of "connected" modes (e.g., Radio Resource Control states— Cell Dedicated Channel DCH, Cell Forward Access Channel FACH, Cell Paging Channel PCH, and UMTS Terrestrial Radio Access Network (UTRAN) Registration Area (URA) Paging Channel PCH) and an idle mode. Typically, in the connected mode a client terminal may be fully or partially connected to a wireless network to receive and/or transmit data (e.g., voice or data calls or sessions) with one or more access points (e.g., base stations, Node B, femto cell, etc.). In connected mode, conventional client terminals may consume a significant amount of power to sustain circuitry needed to monitor a data channel and/or maintain a connection with the wireless network. In idle mode, the client terminal may monitor control channels, such as a paging channel (PCH) for paging messages. Such paging messages may include messages that alert the client terminal to the occurrence of an incoming data message (e.g., a data packet or segment) and control/overhead messages that carry system information and other information for the client terminal. While power consumption in idle mode is substantially less than in connected mode, there is a longer delay in powering the circuitry and re-establishing a wireless network connection from idle mode if a message is received. This delay is relatively long (e.g., in comparison to delays in connected mode) and would impact the user experience noticeably (e.g., noticeable delay in receiving a message, a dropped message, increased retries from sender, etc.). Thus, maintaining the wireless terminal in a connected mode results in faster power depletion or consumption but switching to idle mode results in a noticeable lag or delay.

Therefore, there is a need for a solution that reduces power consumption of a client terminal while avoiding noticeable delays typically associated with power-conserving modes operation.

SUMMARY

One feature provides a system and method for facilitating power conservation in a client terminal by using a proxy device to listen for data messages for the client terminal while the client terminal switches from a connected mode to a disconnected, inactive, and/or lower power mode.

According to one feature, a method operational on a client terminal is provided. The client terminal is operated in a first mode where a first communication interface is communicatively connected to an access point and the operating mode of the client terminal is known to the access point. Subsequently, the client terminal may determine whether it should switch from the first mode to the second mode. For instance, the client terminal may switch from the first mode to the second mode if inactivity on the first communication interface exceeds a threshold amount of time. To switch to second mode, the client terminal may send a request to a proxy device requesting it to operate as a proxy by monitoring a data channel for the client terminal and forwarding data messages for the client terminal via a second communication interface. The request may include a client terminal identifier, a channel identifier, and one or more decoding parameters for the data channels. The client terminal may then receive an acknowledgment reply from the proxy device indicating that it is acting as a proxy for the client terminal.

The client terminal may then be operated in a second mode where the first communication interface is communicatively disconnected from the access point while the access point still believes that the client terminal is operating in the first mode. The second communication interface may then be monitored for data messages from the access point that have been forwarded by the proxy device.

Subsequently, the client terminal may receive a forwarded data message from the proxy device via the second communication interface. The client terminal may then determine whether the client terminal should switch from the second mode to the first mode after receiving the forwarded data message. In one example, the client terminal is switched from the second mode to the first mode if additional data messages are expected over the data channel.

According to an optional feature, the client terminal may receive a wake-up signal from the proxy device, the wake-up signal indicating that data messages for the client terminal will be forthcoming over the data channel. The client terminal may then switch to the first mode as a result of the wake-up signal.

In on example, the first mode may be a connected mode within a Radio Resource Control as defined by a Universal Mobile Telecommunications System (UMTS) standard. For instance, the connected mode may use at least one of a Cell Dedicated Channel (Cell_DCH), a Cell Forward Access Channel (Cell_FACH), a Cell Paging Channel (Cell_PCH), and UMTS Terrestrial Radio Access Network (UTRAN) Registration Area Paging Channel (URA_PCH). The second mode may be a disconnected mode or idle mode within a Radio Resource Control as defined by a Universal Mobile Telecommunications System (UMTS) standard.

In another example, the first mode may be a connected mode within an Evolution Data Only (EVDO) standard, where the connected mode is an active mode. The second mode may be a disconnected mode within an Evolution Data Only (EVDO) standard, where the disconnected mode is at least one of a suspended mode, an idle mode, a sleep mode, and an off mode.

According to one implementation of the client terminal, the client terminal may include a first communication interface, a second communication interface, and/or a processing circuit. The first communication interface for wirelessly communicating with an access point. The second communication interface for wirelessly communicating with a proxy device. The processing circuit may be coupled to the first communication interface and the second communication interface. The processing circuit may be configured to: (a) operate in a first mode where the first communication interface is communicatively connected to the access point and the operating mode of the client terminal is known to the access point; (b) send a request to the proxy device requesting it to operate as a proxy by monitoring a data channel for the client terminal and forwarding data messages for the client terminal via the second communication interface; (c) operate in a second mode where the first communication interface is communicatively disconnected from the access point while the access point still believes that the client terminal is operating in the first mode; and/or (d) monitor the second communication interface for forwarded data messages from the proxy device. In on example, using the first communication interface may consume more power than the second communication interface. In another example, the first communication interface may have a longer range than the second communication interface. In another example, the first communication interface has a greater bandwidth than the second communication interface. At least one of the first communication interface and the second communication interface may be a wireless communication interface. In the first mode, the client terminal may monitor the data channel for data messages via the first communication interface. In the second mode the data channel is unmonitored by the client terminal. In one example, the first communication interface is a Code Division Multiple Access (CDMA)-compliant interface and the second communication interface is any Bluetooth compliant interface.

According to another feature, a method operational on a proxy device is provided. A request is received from a client terminal to operate as a proxy for the client terminal. In response, the proxy device may add the client terminal to a proxy list and may send an acknowledgment reply to the client terminal accepting the request. The proxy device then monitors for data messages on a data channel for the client terminal via a first communication interface. Subsequently the proxy device may receive a data message intended for the client terminal. The proxy device may translate the data message from a first communication protocol associated with the first communication interface to a second communication protocol associated with the second communication interface. The proxy device then sends, forwards, or relays the received data message to the client terminal via a second communication interface. According to one example, the proxy device may receive an acknowledge message via the second communication interface in response to sending the data message to the client terminal. Consequently, the proxy device may forward the acknowledge message to the access point via the second communication interface.

According to another example, the proxy device may determine whether additional data messages are imminent after receiving the data message for the client terminal. If so, the proxy device sends a wake-up signal from the proxy device if it is determined that additional data messages are imminent. In one example, the first communication interface may consume more power than the second communication interface for a given data message size. In some implementations, the proxy device may operate as a proxy for a plurality of client terminals by monitoring data channels associated with the plurality of client terminals.

Note that, when the proxy device is operating as a proxy for the client terminal, the operating mode of the client terminal is different than that expected by the access point. The access point believes it is communicating directly with the client terminal while the client terminal is in fact disconnected from the access point. In one example, the access point believes that the client terminal is operating in a connected mode within a Radio Resource Control as defined by a Universal Mobile Telecommunications System (UMTS) standard. For instance, the connected mode may use at least one of a Cell Dedicated Channel (Cell_DCH), a Cell Forward Access Channel (Cell_FACH), a Cell Paging Channel (Cell_PCH), and UMTS Terrestrial Radio Access Network (UTRAN) Registration Area Paging Channel (URA_PCH). The client terminal is in fact operating in a disconnected mode or idle mode within a Radio Resource Control as defined by a Universal Mobile Telecommunications System (UMTS) standard. In another example, the access point believes that the client terminal is operating in a connected mode as defined in an Evolution Data Only (EVDO) standard, where the connected mode is an active mode. However, the client terminal is in fact operating in a disconnected mode within an Evolution Data Only (EVDO) standard, where the disconnected mode is at least one of a suspended mode, an idle mode, a sleep mode, and an off mode.

According to one implementation of the proxy device, the proxy device may include a first communication interface, a second communication interface, and/or a processing circuit. The first communication interface is adapted for wirelessly communicating with an access point. The second communication interface is adapted for wirelessly communicating with a client terminal. The processing circuit is coupled to or between the first communication interface and the second communication interface. The processing circuit may be configured to: (a) receive a request from the client terminal to operate as a proxy for the client terminal; (b) monitor for data messages on a data channel for the client terminal via the first communication interface; and/or (c) send a received data message to the client terminal via the second communication interface.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
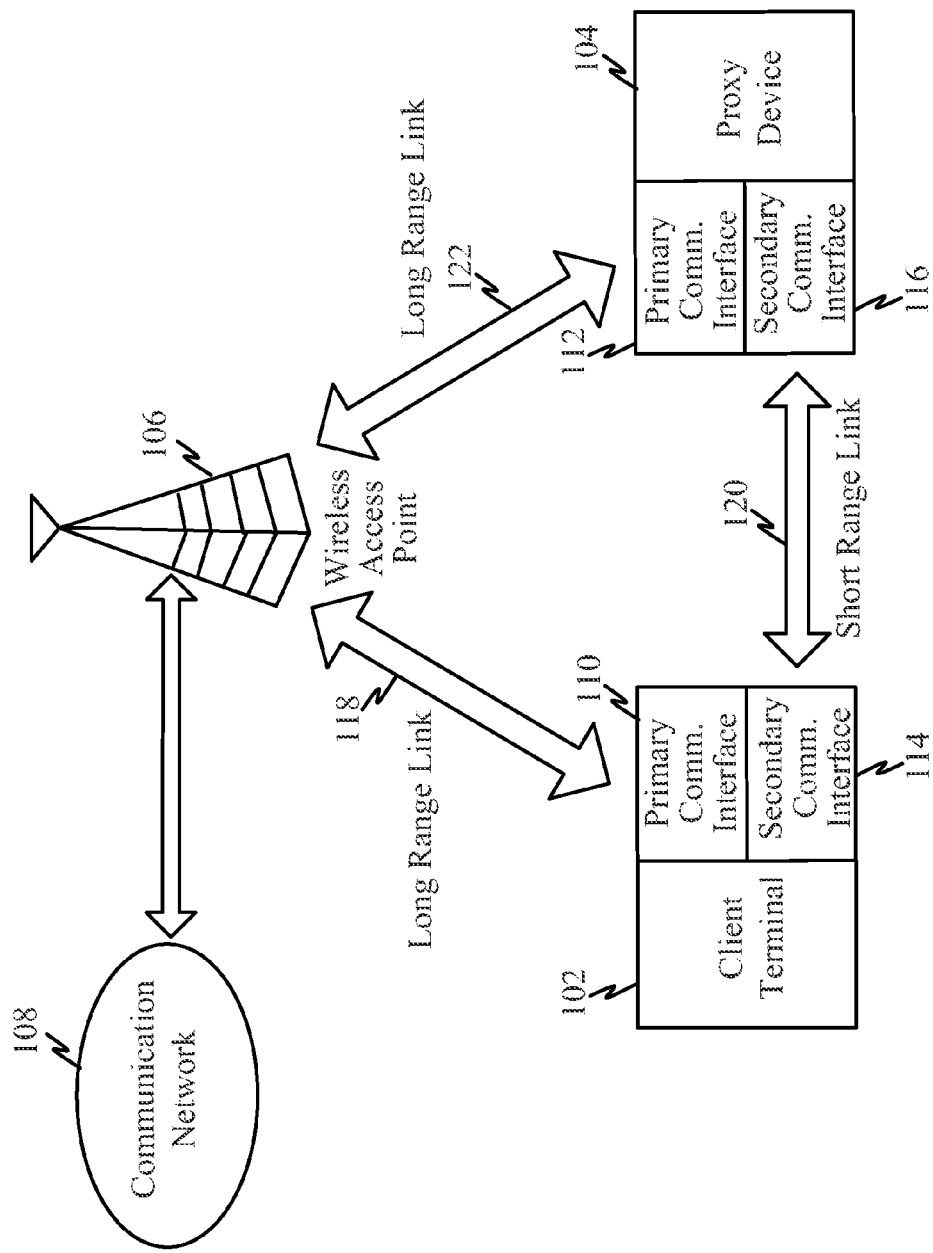
FIG. 1 is a block diagram illustrating a wireless communication system in which a proxy device may facilitate power conservation in client terminals.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

In the following description, certain terminology is used to describe certain features of one or more embodiments. For instance, the term "access point" refers to a device that facilitates wireless connectivity (for wireless communication devices) to a communication or data network. The term "access point" may include base stations, Node-B devices, femto cells, pico cells, etc. The term "client terminal" refers to mobile phones, pagers, wireless modems, personal digital assistants, personal information managers (PIMs), palmtop computers, laptop computers, and/or other mobile communication/computing devices which communicate, at least partially, through a wireless or cellular network. The term "proxy device" may include any device having wireless communication capabilities that receives data messages intended for a client terminal over a primary communication interface and/or forwards such data messages to the intended client terminal over a secondary communication interface. The term "data message" may include a message that carries or conveys various types of content, information, commands, instructions, paging information and/or control signals.

Overview

One feature provides a system, apparatus, and method for facilitating power conservation in a client terminal by using a proxy device to listen for incoming data messages for the client terminal while the client terminal switches its primary communication interface to an inactive, disconnected, and/or low-power state (e.g., from a connected mode to an disconnected or inactive mode). A client terminal may include a primary communication interface (e.g., a long range or high bandwidth interface) for receiving signals from a wireless network, and a secondary communication interface (or a short range or low bandwidth interface) for receiving signals over a short range (e.g., a few feet, or less than a mile) from nearby devices. In one example, the primary communication interface may be any CDMA compliant communication interface and the secondary communication interface may be a Bluetooth compliant interface. One difference between the primary and secondary range communication interfaces is that the secondary communication interface may consume less power than the primary communication interface. Consequently, the primary communication interface may also be referred to a high power communication interface and the secondary communication interface may be referred to as a low power communication interface. It should be clear that the terms "high power" and "low power" are relative terms and do not imply a particular level of power consumption. That is, the low power communication interface simply consumes less power than the high power communication interface.

The client terminal may be powered by an internal power source (e.g., battery) that powers its communication interfaces. During operation, the client terminal may change to various connected modes (e.g., Radio Resource Control states—Cell DCH, Cell FACH, Cell PCH, and URA PCH) either on its own or under the direction or instructions received from the wireless network (e.g., access point) that services the primary communication interface. Consequently, the wireless network or access point expects the client terminal to be on that connected mode and sends messages according to the protocol specified for that connected mode. However, to lengthen the useful life of the internal power source, one feature may provide for the client terminal to actually go into an disconnected or inactive mode (e.g., a power conserving mode or low-power mode), powering off its primary communication interface while using an external proxy device to listen for data messages on a data channel intended for the client terminal from the wireless network or access point. The decision to change from a connected mode to a disconnected or inactive mode may be the sole discretion of the client terminal and this change in not communicated to the wireless network. Thus, the wireless network believes that the client terminal is in a connected mode even though it is really in a disconnected or inactive mode. Power conservation is achieved by virtue of the client terminal switching from the connected mode, where the data channel may be continuously or periodically monitored, to a power savings mode (disconnected or inactive mode) where the data channel is not monitored or infrequently monitored, while still maintaining connected mode performance by making the wireless network or access point believe it is still operating in connected mode.

To establish the proxy device, the client terminal may scan, within its transmission range over the secondary communication interface, for locally available proxy devices. Once available proxy devices are detected, the client terminal may determine if any of the available proxy devices have a primary communication interface for monitoring its data messages from the wireless network and a secondary communication interface for directly communicating with the client terminal over a short range. Upon determining the available proxy devices with primary communication interfaces within its transmission range, the client terminal may negotiate with one or more of the available proxy devices to serve as its proxy. For example, the client terminal may select one proxy device to serve as its "proxy" based on which available proxy device has the best or strongest short range link (via the secondary communication interface) as measured or perceived at the client terminal. The client terminal may provide its one or more data channels and/or associated parameters to the selected proxy device so that the proxy device can listen on, or monitor, the one or more data channels.

The proxy device may listen for data messages intended for the client terminal on the client terminal's data channels initiated or sent by one of more access points of the wireless network. In one example, the proxy may use its primary communication interface (similar to the primary communication interface that has been shut off by the client terminal) to listen for, or receive, the data messages. When the proxy device detects a message intended for a client terminal for which it is acting as a proxy, the proxy device may forward the data message to the client terminal via its secondary communication interface.

Upon receipt of a data message from the proxy device via the secondary communication interface, the client terminal may stay in disconnected or inactive mode. In other instances (e.g., were the data message comprises multiple packets), the client terminal may switch back to connected mode, either on its own or under a wake-up signal by the proxy device, to receive data messages over the primary communication interface.

Exemplary Network Environment

FIG. 1 is a block diagram illustrating a wireless communication system in which a proxy device may facilitate power conservation in client terminals. A client terminal 102 and a proxy device 104 may be capable of communicating through a communication network 108 via one or more wireless access points 106 (e.g., base stations or Node Bs, femto cells, pico cells, etc.) that may be part of the communication network 108.

The client terminal 102 and proxy device 104 may include primary (e.g., high power or long range) communication interfaces 110 and 112 (or transceivers) for communicating directly with the wireless access point 106 through a first wireless link 118 and second wireless link 122, respectively. Furthermore, the client terminal 102 and proxy device 104 may also include secondary (e.g., low power or short range) communication interfaces 114 and 116 (or transceivers) for communicating directly with each other via a third wireless link 120. Note that the first and second wireless links 118 and 122 may operate on a first frequency band or channel while the third wireless link 120 may operate on a second frequency band or channel different or distinct from the first frequency band or channel. In one implementation, the secondary communication interface, also referred to as a low power interface, may consume less power than the primary communication interface which may be referred to as a high power interface. It should be clear that the terms "high power" and "low power" are relative terms and do not imply a particular level of power consumption. The secondary communication interfaces 114 and 116 simply consume less power than the primary communication interfaces 110 and 112 for a given time of operation in equivalent operating modes (e.g., connected modes). This merely recognizes that lower bandwidth and/or shorter range interfaces will consume less power than higher bandwidth and/or longer range interfaces. The client terminal 102 may be powered by an internal (limited) power source (e.g., battery).

The client terminal 102 may operate in various modes, including a first (or connected) mode and a second (or disconnected/inactive/low-power) mode. While in the connected mode, the client terminal 102 may use its primary communication interface to communicate with the access point 106 to establish a call/session for receiving and/or transmitting data messages. In connected mode, the client terminal may continuously or frequently monitor its data channel. In disconnected/inactive mode, the client terminal 102 may turn Off its primary communication interface (e.g., either periodically or aperiodically), and may monitor a paging channel for paging messages sent by the access point 106.

The operating mode of the client terminal 102 (or it primary communication interface 110) may be communicated to and/or set by wireless access point 106 or other entity of the wireless network. For example, the access point 106 may know the connected mode (e.g., Radio Resource Control state—Cell DCH, Cell FACH, Cell PCH, or URA PCH)) of the client terminal 102. Thus, the wireless network or access point 106 expect the wireless terminal 102 to respond according to its expected operating mode (e.g., reply to data messages within a given time period, etc.).

In order to conserve power, the client terminal 102 may be configured to unilaterally change its operating mode (or at least the operating state of the primary communication interface 110) from connected mode to an inactive, disconnected and/or low-power mode (e.g., idle or sleep mode) without notifying the wireless network or access point 106. Due to this change in operating mode, the primary communication interface 110 is turned Off, thereby conserving power. Prior to changing from the connected mode to the disable/sleep mode, the client terminal 102 may request that the proxy device 104 act as its proxy for monitoring it data channel(s) with the access point 106. That is, the client terminal 102 may find local or nearby proxy devices by scanning on its primary communication interface 110 (e.g., monitoring for messages from proxy devices over a common wireless channel) and/or secondary communication interface 114 (e.g., monitoring for signals indicating the presence of proxy devices). In some implementations, the secondary communication interface 114 may be used to scan for proxy devices since it is the interface that will be used to receive messages from the proxy device 104 when the client terminal switches to disconnected, inactive, and/or low-power mode (e.g., where the primary communication interface 110 is turned Off). In performing such scan, the client terminal 102 may attempt to identify potential proxy devices that have both a primary communication interface and a secondary communication interface. This is so that a proxy device 104 is able to receive data messages via its primary communication interface 112 (e.g., data messages from the access point 106 intended for the client terminal 102) and forward them to the intended client terminal 102 via the secondary communication interface 116.

When one or more proxy devices are identified by the client terminal 102, it may select one proxy device 104 to serve as its "proxy" based on which available proxy device has the best or strongest short range link as measured or perceived at the client terminal's secondary communication interface 114. The client terminal 102 may send a proxy request to the selected proxy device 104 along with its data channel parameters. In some implementations, the client terminal 102 may pre-establish a secure relationship with one or more proxy devices. By pre-establishing a secure relationship, the client terminal 102 may trust the selected proxy device 104 to forward incoming data messages it detects for the client terminal 102.

In implementations where the selected proxy device 104 and client terminal 102 are both listening to the same access point 106 in the wireless network, their clocks are already synchronized by virtue of listening to the same access point. In an alternative implementation, the client terminal 102 may instead provide clock information for the data channels so that the proxy device 104 can synchronize its own clock to it.

Once the proxy device 104 has been identified and selected, a communication link may be established or setup via the secondary communication interfaces 114 and 116 of the client terminal 102 and proxy device 110, respectively. For example, if the secondary communication interface 116 is a Bluetooth compliant interface, the proxy device 112 may be configured to operate according to a pseudo-random sequence called a hop sequence or frequency hop sequence so that the proxy device 110 and the client terminal 102 can communicate with each other via their respective secondary communication interfaces 116 and 114. Once the selected proxy device 104 has been established as a proxy for the client terminal 102, The client terminal 102 may then change its operating mode (e.g., from connected mode to disconnected/inactive mode) without informing the wireless network (e.g., access point) for the primary communication interface. In changing from connected mode to disconnected/inactive mode, the client terminal 102 may power down (or turn Off) all or part of its primary communication interface 110 and may activate its secondary communication interface 114 to receive data messages via the proxy device 104. As the primary communication interface 110 consumes more power than the secondary communication interface 114, shutting the primary communication interface 110 Off (or lowering its operating state) and using the secondary communication interface 114 to receive incoming messages via the proxy device facilitates power conservation at the client terminal 102.

The selected proxy device 104 may monitor the data channel(s) of the client terminal 102 over its primary communication interface 112 and forwards any data messages intended for the client terminal 102 via the secondary communication interface 116 to the client terminal 114. The proxy device 104 may similarly act as a "proxy" for a plurality of other client terminals by monitoring their respective data channels and forwarding data messages via its secondary communication interface 116 to the intended client terminal.

According to one feature, the proxy scheme between the client terminal 102 and the proxy device 104 may be transparent to the rest of the communication system, including the wireless network and access point 106. Therefore, the access point 106 is not informed that the client terminal 102 has changed to disconnected/inactive mode but still believes it is operating in a connected mode. Therefore, the proxy scheme is transparent to the access point 106 and it need not modify its operations or the way it communicates with the client terminal 102.

According to yet another feature, the client terminal 102 may periodically transmit a ping over its secondary communication interface 114 to the proxy device 104 to determine if the proxy device 104 is still within range to act as a proxy. If a specified amount of time elapses without a response from the proxy device 104 to the ping, the client terminal 102 may power up its primary communication interface 110 to receive data messages directly from the access point 106 as the proxy device 104 is assumed to be out of range and no longer acting as its proxy. If another proxy device is detected within transmission range, the client terminal 102 may associate with the new proxy device, power down its primary communication interface 110 and activate its secondary communication interface 114 to receive data messages from the new proxy device.

As used herein, the access point 106 may be a device that can wirelessly communicate with one or more terminals and may also be referred to as, and include some or all the functionality of, a base station, a Node B, or some other similar devices. A terminal (e.g., client terminal) may also be referred to as, and include some or all the functionality of, a user equipment (UE), a wireless communication device, a mobile station, computer, laptop, mobile phone, cellular phone, or some other terminology. In some implementations, the operations and/or functionality of the proxy device may be integrated in an access point.

Figure 2:
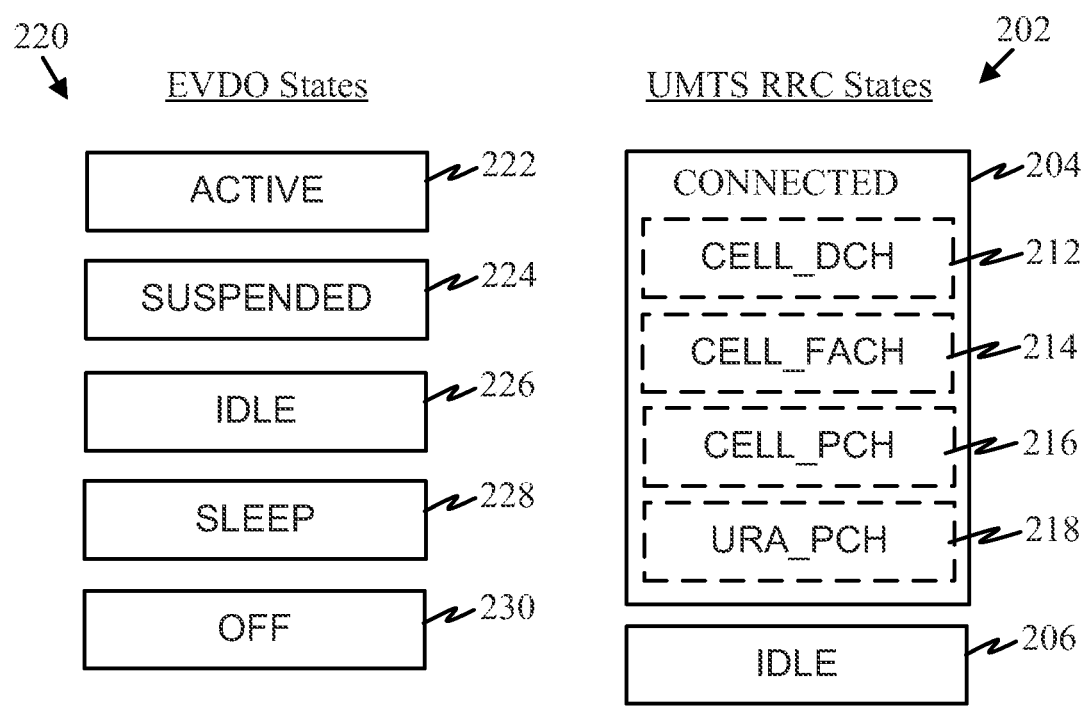
FIG. 2 illustrates two examples of operating modes for different wireless communication standards.

Exemplary Operating Modes—As described herein, power conservation at the client terminal is achieved by switching from connected mode to a disconnected/inactive mode. FIG. 2 illustrates two examples of operating modes for different wireless communication standards. Generally, a "connected mode" refers to an operating state in which the primary communication interface is enabled, activated or powered On (e.g., continuously powered On, periodically powered On, momentarily powered On) to provide access to radio resources via a network. By contrast, a "disconnected mode", "inactive mode" and/or "low-power mode" (e.g., "idle or sleep modes") refer to an operating state in which the primary communication interface is powered Off (e.g., continuously powered Off, periodically powered Off, momentarily powered Off) so that it does not have access to the radio resources via the network.

For example, the Universal Mobile Telecommunications System (UMTS) Wideband Code Division Multiple Access (W-CDMA) is an air interface standard that specifies a Radio Resource Control (RRC) defining various modes of operation. The UMTS RRC States 202 define a connected mode 204, and/or an idle mode 206. The connected mode 204 may include a plurality of states, including Cell DCH 212, Cell FACH 214, Cell PCH 216, and URA PCH 218. In these connected modes, access to the radio resources may be provided to the wireless network. The idle mode 206 (e.g., an inactive mode) has the lowest power consumption since there is no connection to the wireless network (e.g., primary communication interface is turned Off). In one example, Cell FACH 214 consumes roughly fifty percent the power of CELL DCH 212, and CELL PCH 216 consumes just a few percent of the power consumption of Cell DCH 212.

Similarly, Evolution-Data Only (EVDO) is part of the CDMA2000 family of standards and defines a plurality of EVDO operating states 220, including an active mode 222, a suspended mode 224, an idle mode 226, a sleep mode 228, and an off mode 230.

Exemplary Primary Communication Interface—One example of a primary communication interface 110/112 may be a long range, high power, and/or high bandwidth communication interface such as a W-CDMA compliant transceiver. However, in other examples, such high power interface may operate according contemporary communication standards, including but not limited to W-CDMA, cdma2000, GSM, WiMax, and WLAN.

Exemplary Secondary Communication Interface—One example of a secondary communication interface 114/116 may be a short range, low power, and/or low bandwidth communication interface such as a Bluetooth compliant transceiver that uses a time-division duplex (TDD) scheme. Such Bluetooth interface may alternately transmit and receive in a synchronous manner. This allows a plurality of terminals connected via Bluetooth technology to communicate in an ad hoc fashion often called piconet.

The power conservation techniques described herein may be implemented on various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available.

Note that the data channel used in connected mode is different or distinct from signaling/control channels typically used in a disconnected mode. In particular, the data channel may carry various types of content, data and/or control signals and is continuously or frequently monitored. On the other hand, the signaling/control channel does not carry data and is monitored only periodically (e.g., for paging signals).

Figure 3:
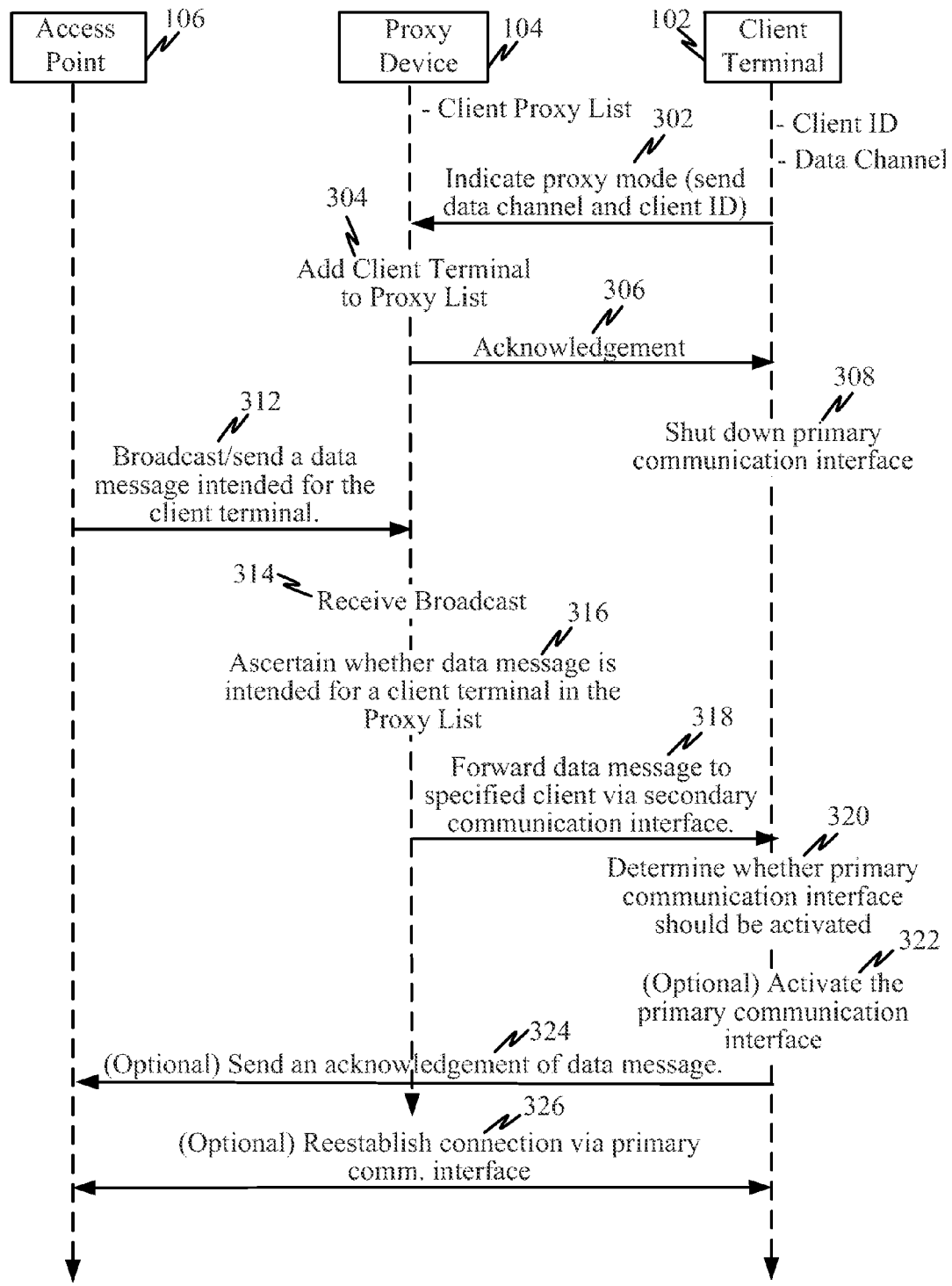
FIG. 3 is a flow diagram illustrating the operation of a wireless communication system in which a proxy device facilitates power conservation in client terminals.

FIG. 3 is a flow diagram illustrating the operation of a wireless communication system in which a proxy device facilitates power conservation in client terminals. In this example, the access point 106, proxy device 104, and client terminal 102 of FIG. 1 are used for illustration purposes. The client terminal 102 may store a Client Identifier (ID) and/or data channel information for the channel of the client terminal 102. The proxy device 104 may maintain a client proxy list of the client identifiers and data channels of the client terminals for which the proxy device 104 is acting as a proxy.

When the client terminal 102 wishes to conserve power, it may indicate to the proxy device 104 to operate as its proxy by sending its data channel(s) and client ID 302 and/or other data channel parameters. For instance, such data channel parameters may include a channel identifier and/or channel decoding parameters. Using the client ID (and/or channel identifier and channel decoding parameters), the proxy device 104 then adds the identifier of the client terminal 102 to its proxy list 304 and sends an acknowledgement 306 to the client terminal 102 to acknowledge receipt of the information. After receiving the acknowledgement 306, a communication link has been effectively setup between the client terminal 102 and proxy device 104. The client terminal 102 may then shut down (or powers down) its primary communication interface 308 (e.g., switches from a connected mode to a disconnected/ inactive mode) while maintaining its secondary communication interface 310 active to communicate with the proxy device 104.

The access point 106 may broadcast/send a data message (e.g., as one or more packet transmissions) intended for the client terminal 102. The proxy device 104 may receive the broadcast 314 over its primary communication interface. Once the broadcast has been received, the proxy device 104 may ascertain whether the data message is intended for a client terminal 102 in its proxy list 316. The proxy device 104 may forward the data message to the specified client terminal 102 via its secondary communication interface 318 if the data message is intended for a client terminal in the proxy list of the proxy device 104.

The client terminal 102 may receive the data message via its secondary communication interface. Upon receipt of the data message via its secondary communication interface, the client terminal 102 determines whether it should activate its primary communication interface 320. For example, if the data message indicates that it is complete (e.g., no further data packets are expected), then the client terminal 102 may simply send an acknowledgment message via its secondary communication interface to the proxy device 104, which can then forward it to the access point 106. That is, if the received data message is complete, there is no need to activate the primary communication interface of the client terminal 102. Alternatively, if a large amount of data is to be received (e.g., the received data message is just one packet out of many packets to come), then the primary communication interface for the client terminal 102 is activated 322 (e.g., switched to connected mode) so that the client terminal 102 may receive the subsequent data messages (e.g., remaining packets). In some implementations, the client terminal 102 may make the determination to activate its primary communication port on its own. In other implementations, the proxy device 104 (upon determining that additional data messages will be coming) may send a wake-up signal to the client terminal via the secondary communication interface which causes the client terminal to activate its primary communication interface.

If the client terminal 102 activates its primary communication interface, the client terminal may reestablish a connection with the access point 106 via the primary communication interface 326. Optionally, an acknowledgement of the data message may be sent 324 by the client terminal 102, either indirectly via the proxy device 104 (through the secondary communication interface) or directly via the primary communication interface of the client terminal.

In some implementations, the functionality of a proxy device may be integrated into a terminal or an access point. For instance, an access point may have both a primary communication interface, which is normally used to communication with the terminals being served, and a secondary communication interface compatible with the secondary communication interfaces for the terminals being served. In this particular configuration, since the secondary interface is located on the access point (which typically has a plentiful power supply), it may be able to boost the operating transmission range of its secondary communication interface beyond the typical transmission range of such power interfaces. In this manner, an access point may be able to forward data messages over its secondary communication interface to the corresponding secondary communication interfaces of served terminals (e.g., client terminals) that have shut off primary communication interfaces.

Exemplary Client Terminal

Figure 4:
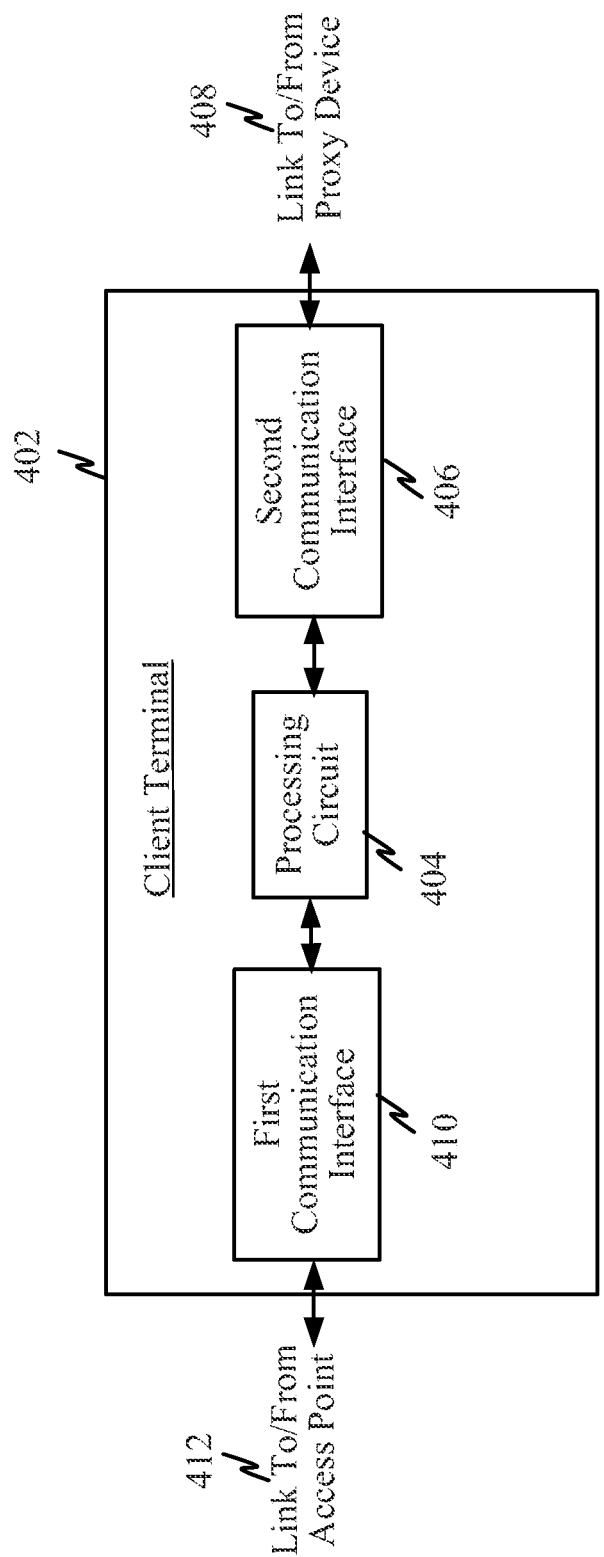
FIG. 4 is a block diagram of an example of a client terminal configured for power conservation by using a proxy device.

FIG. 4 is a block diagram of an example of a client terminal configured for power conservation by using a proxy device. The client terminal 402 may include a processing circuit 404, such as a small and/or low-power microprocessor. The client terminal 402 may also include a first (e.g., primary) communication interface 410 that allows the client terminal 402 to communicate with devices on a first wireless network, e.g., via a link to/from a network access point 412. For example, the first communication interface 410 may be a high power communication interface used for long range communications, such as over a CDMA-compliant network. The client terminal 402 may also include a second (e.g., secondary) communication interface 406 communicatively coupling the client terminal 402 to devices on a second wireless network, such as a direct wireless link to a proxy device 408. For example, the second communication interface 406 may be a low power communication interface used for short range communications, such as over a Bluetooth-compliant network. The client terminal 402 may be battery-powered and the amount of power such battery can provide is limited.

In prior art approaches, the first communication interface of the client terminal is powered On, either continuously (e.g., continuous monitoring in connected mode) or periodically (e.g., when switching from an idle mode) to listen for incoming data or paging messages, draining the power from the internal power source (e.g., battery) of the client terminal 402. For instance, a data channel may be frequency band that is shared among client terminals for a wireless network in a synchronous fashion (e.g., time-slots assigned to each client terminal in the wireless network) or asynchronous fashion (e.g., scan all transmissions on the wireless network to determine which one is addressed to the client terminal). In synchronous fashion, the client terminal may be assigned specific frames on which it may receive terminal-specific data messages. With such a data channel, the client terminal can enter discontinuous reception operation whereby it periodically, rather than continuously, monitors the data channel for data messages using its first communication interface. While in discontinuous reception operation, the client terminal monitors the data channel for incoming messages at specific time intervals. However, even in discontinuous reception operation, the first communication interface is still powered up at pre-determined intervals which drain the internal battery of the client device.

During operation, the client terminal may switch between a connected mode, where the first communication interface is substantially, continuously, or fully powered On, and a disconnected or inactive mode (e.g., idle mode or sleep mode), where the first communication interface is substantially or fully powered Off. In some instances, the operating state (e.g., connected mode, or disconnected mode) of the client terminal is known to the access point (or first wireless network) with which the first communication interface 410 communicates. This allows the access point to know whether it can send data messages via an established data channel to the client terminal or whether it should use a control/signaling channel to inform the client terminal that a communication link over the data channel should be setup to receive incoming data messages. Therefore, the operating state of the client terminal is typically known to the access point.

The client terminal 402 may be configured to achieve improved power savings by using an external or separate proxy device. To achieve this, the client terminal 402 may be adapted to perform one or more operations via its processing circuit 404, first communication interface 410 and/or second communication interface 406. The client terminal 402 may request that a proxy device act as its proxy to monitor its data channel(s) while the client terminal 402 switches from a connected mode to a disconnected or inactive mode. In the disconnected or inactive mode, the client terminal 402 may turn Off its first communication interface 410 for the data channel to conserve power. However, to effectively avoid startup or setup delays associated with switching back from idle/sleep mode to the connected mode, the client terminal does not inform the access point of the change in operating modes from connected mode to disconnected or inactive mode. Therefore, the access point continues to operate under the assumption that the client terminal 402 is still in connected mode (e.g., that the client terminal 402 is continuously monitoring the data channel). However, when the client terminal 402 switches to disconnected or inactive mode it no longer monitors the data channel. For example, in disconnected or inactive mode the client terminal 402 may only monitor a paging channel (e.g., signaling/control channel) distinct from the data channel.

Having assigned a proxy, the client terminal may then monitor its second communication interface 406 to determine if the proxy device has forwarded a data message. If a data message is received on the second communication interface 406, the client terminal 402 may determine whether it should activate its first communication interface. For example, if the data message received by the client terminal 402 has no additional parts or there is no indication of subsequent data messages, then the client terminal 402 stays in disconnected or inactive mode and merely acknowledges reception of the data message (e.g., via the second communication interface 406) and keeps its first communication interface Off. On the other hand, if the received data message indicates that additional data messages are coming (e.g., the received data message is only a first packet in a plurality of packets to come), then the client terminal 402 may switch to connected mode and activate its first communication interface 410 to received the additional messages. Note that the client terminal 402 may continue to receive data messages via the second communication interface 406 from the proxy device until it has switched to connected mode, powered the circuitry for the first communication interface 410, and reestablished communications via the data channel to the access point. In some implementation, the proxy device may recognize that multiple data messages are being sent by the access point to the client terminal 402 and consequently sends a wake-up message to the client terminal 402 that causes the first communication interface 410 to be activated for reception over the data channel.

Figure 5A:
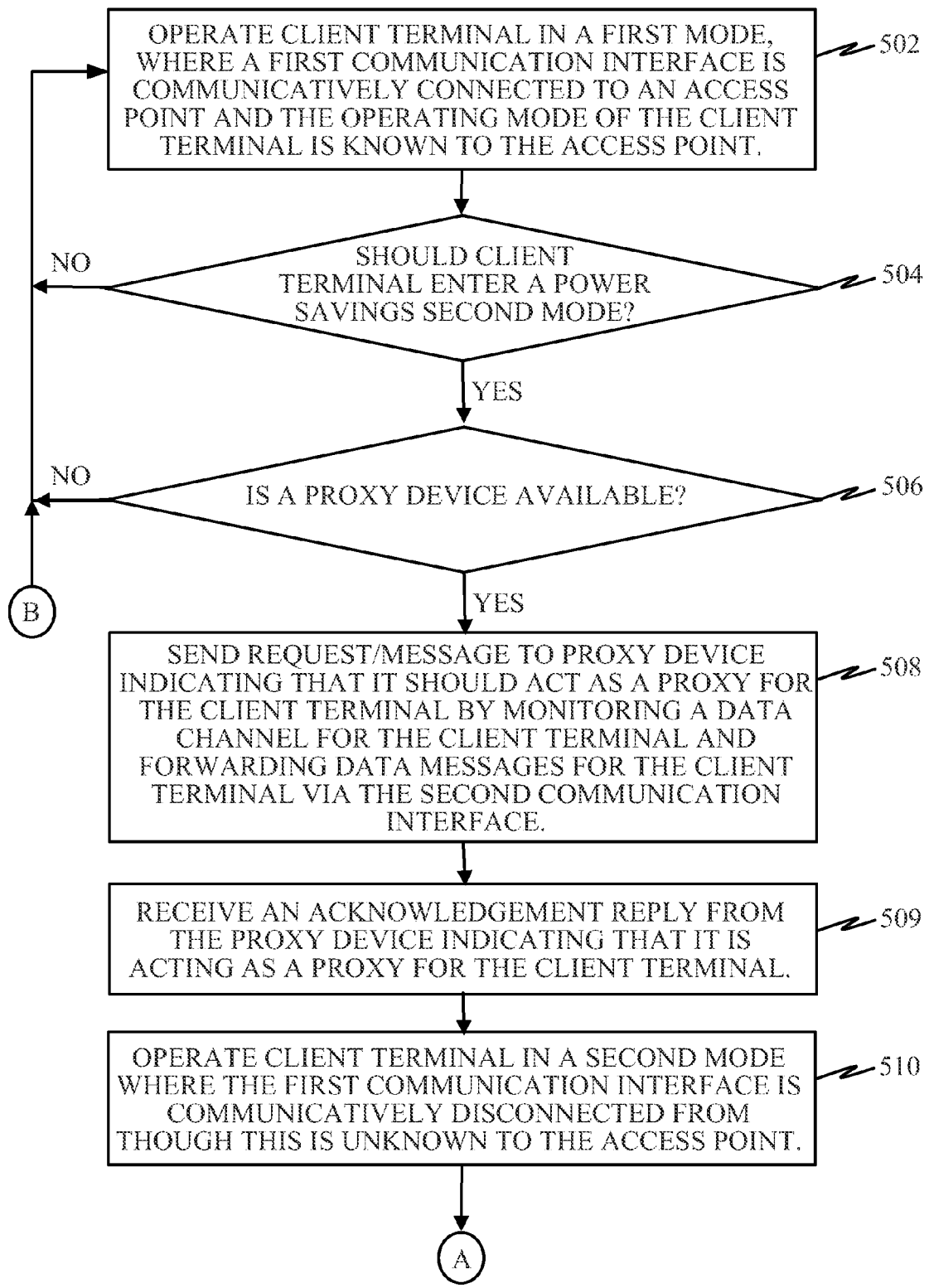
FIG. 5 (comprising FIGS. 5A and 5B) is a flow diagram illustrating a method operational in a client terminal for power conservation by using a proxy device.
Figure 5B:
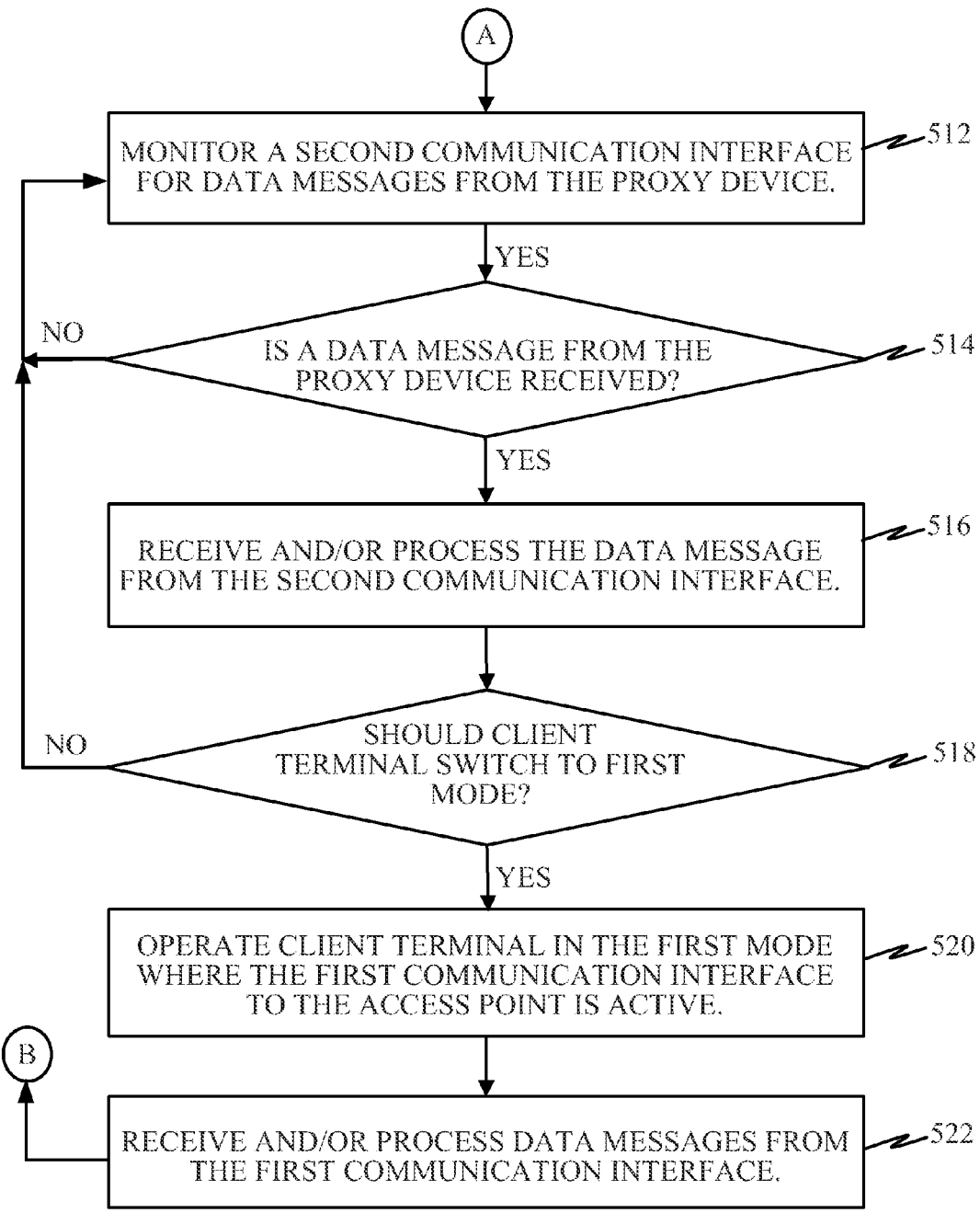

FIG. 5 (comprising FIGS. 5A and 5B) is a flow diagram illustrating a method operational in a client terminal for power conservation by using a proxy device. Initially, the client terminal may operate in a first mode (e.g., connected mode), where a first (e.g., primary) communication interface is communicatively connected to an access point and the operating mode of the client terminal is known to the access point 502. For example, the first communication interface may be a high power or long range for a wireless network and the first mode may be a connected or active mode (e.g., UMTS RRC States—Cell DCH, Cell FACH, Cell PCH, URA PCH). In this example, the client terminal may inform the access point that it is operating in the first mode. In the connected mode, the client terminal may continuously monitor a data channel with the access point. During operation in connected mode, the client terminal determines whether it should enter a power saving second mode 504. For example, if no activity is observed on the data channel for a threshold amount of time (e.g., no packet for the client terminal are received in the last x seconds), then the client terminal may attempt to conserve power by switching to the second mode. To do this, the client terminal may first determine whether a proxy device is available 506. If so, then the client terminal may send a message, request, or notification to the proxy device indicating that it should act as a proxy for the client terminal by monitoring a data channel for the client terminal and forwarding data messages for the client terminal via the second communication interface 508. The request, message, or notification from the client terminal to the proxy device may identify the client terminal, its data channel(s), and/or data channel decoding parameters so that the proxy device can monitor such data channel(s). Note that the data channel in the first mode (e.g., connected mode) may be different or distinct from signaling/control channels typically used in the second mode (e.g., disconnected or inactive mode). In particular, the data channel may carry various types of data and/or control signals and is continuously or frequently monitored. On the other hand, the signaling/control channel does not carry data and is monitored only periodically.

In response to the request, the client terminal may receive an acknowledgment reply from the proxy device indicating that it is acting as a proxy for the client terminal 509. The client terminal may then switch to operate in a second mode where the first communication interface is communicatively disconnected (e.g., periodically or aperiodically inactivated, disconnected, or not communicating), though this is unknown to the access point 510. For instance, the client terminal may switch from a connected mode to a disconnected or inactive mode, but this change in operating mode is not communicated or otherwise detected by the access point. Thus, the access point may continue to operate as if the client terminal was in the first mode (e.g., the access point may transmit on the data channel to the first communication interface of the client terminal). The client terminal then monitors a second communication interface for data messages from the proxy device 512. Note that the second communication interface utilizes a different channel than the data channel for the first communication interface. If a data message is received (via the second communication interface) from the proxy device 514, the client terminal may process the data message from the second communication interface 516. The client terminal may then determine whether it should switch back to the first mode of operation 518. For example, if the data message received (via the second communication interface) indicates that additional data messages or packets are coming, then the client terminal switches to first mode where the first communication interface to the access point is active 520. Note that the client terminal may then receive and/or process data messages from the first communication interface 522.

Exemplary Proxy Device

Figure 6:
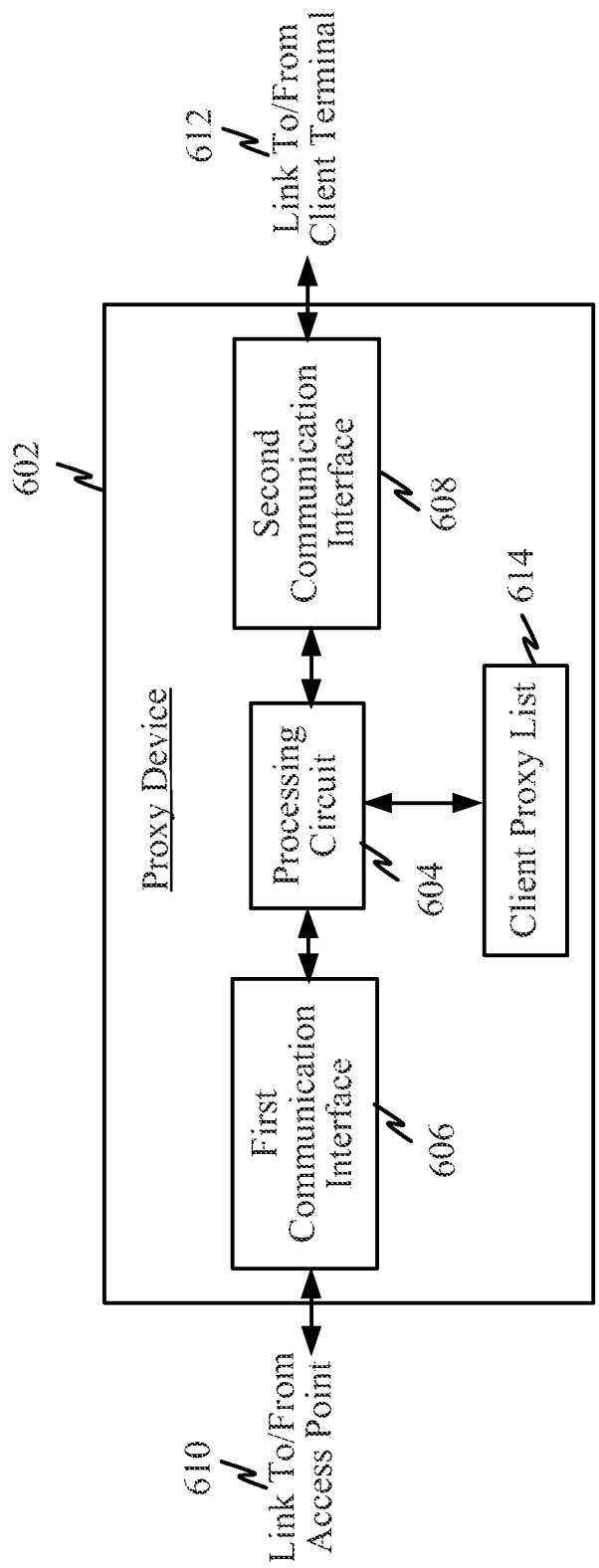
FIG. 6 is a block diagram of an example of a proxy device configured to act as a proxy for client terminals to facilitate power conservation in the client terminals.

FIG. 6 is a block diagram of an example of a proxy device configured to act as a proxy for client terminals to facilitate power conservation in the client terminals. The proxy device 602 may include a processing circuit 604, a first (e.g., primary) communication interface 606, and a second (e.g., secondary) communication interface 608. The first communication interface 606 communicatively couples the proxy device 602 to an access point via a first wireless communication link 610. For example, the first communication interface 606 may be a high power interface used for long range communications, such as over a CDMA-compliant network. The second communication interface 608 may be used to couple the proxy device 602 to a client terminal 614. For example, the second communication interface 608 may be a lower power interface used for short range communications, such as over a Bluetooth-compliant network.

In one mode of operation, the proxy device 602 may be configured to monitor data channels for client terminals identified on a client proxy list 614 via its first communication interface 606. That is, the proxy device 602 may have agreed to act as a proxy for one or more client terminals. In such proxy mode, the proxy device 602 may use its first communication interface 606 to monitor the data channel(s) associated with the client terminals for which it agreed to act as a proxy. If a data message is received in a paging channel, the proxy device 602 may forward the data message through its second communication interface 608 via a link to the corresponding client terminal 612. In forwarding the data message, the proxy device 602 may translate it from a first protocol (associated with the first communication interface 606) to a second protocol (associated with the second communication interface 608).

Figure 7:
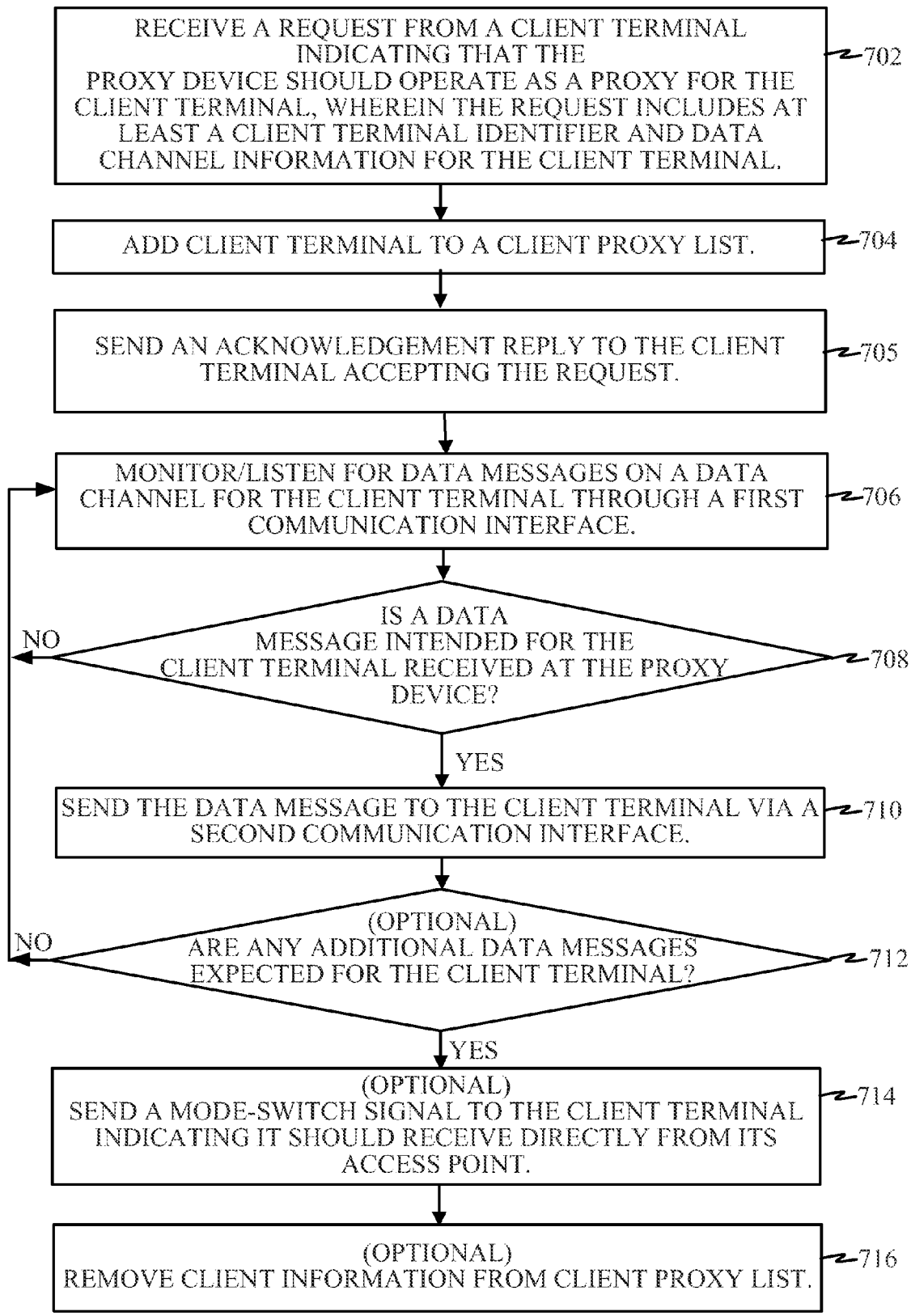
FIG. 7 is a flow diagram illustrating a method operational in a proxy device for facilitating power conservation in client terminals.

FIG. 7 is a flow diagram illustrating a method operational in a proxy device for facilitating power conservation in client terminals. A request/notification, including a client terminal identifier and data channel information associated with the client terminal, may be received from a client terminal indicating that the proxy device should operate as a proxy for the client terminal 702. The data channel information may include a channel identifier and one or more parameters for decoding a particular data channel. Such request/notification may be received on either a first (e.g., primary) communication interface or a second (e.g., secondary) communication interface of the proxy device. The client identifier and data channel(s) information associated with the client terminal may then be added to a client proxy list on the proxy device 704. Effectively, the proxy device may then receive data from an access point that is intended for the client terminal. The proxy device may also send an acknowledgement reply to the client terminal accepting the request 705. Such acknowledgement allows the client terminal to know that the request has been accepted, thereby allowing it to turn off its first communication interface.

The proxy device may then listen or monitor for data messages on the data channel(s) (e.g., using the received data channel information) for the client terminal through a first communication interface 706. The proxy device may determine whether the received data message is intended for a client terminal on the proxy list 708. If no data messages for the client terminals in the proxy list are received, the proxy device may continue to listen for data messages 706 on the data channel(s) for the client terminal via its first communication interface. If the proxy device receives a data message that is meant for a client terminal on the proxy list, the proxy device forwards the data message to the client terminal via its second communication interface 710.

According to some optional features, the proxy device may determine whether there are any additional data messages expected for the client terminal 712. For example, if the received data message includes a first packet from a plurality of packets to come, then the proxy device may send a mode-switch signal to the client terminal indicating it should receive directly from its access point 714. That is, the mode-switch signal may cause the client terminal to active its communication interface to the access point. Once the data message has been forwarded to the corresponding client terminal, the client terminal may be removed from the client proxy list 716 of the proxy device.

One or more of the components, steps, features and/or functions illustrated in FIGS. 1, 2, 3, 4, 5, 6, and/or 7 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 3, 4, and/or 6 may be configured to perform one or more of the methods, features, or steps described in FIGS. 2, 3, 5, and/or 7. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A client terminal comprising:
   a first communication interface for wirelessly communicating with an access point;
   a second communication interface for wirelessly communicating with a proxy device, wherein the first communication interface has a longer range that the second communication interface;
   a processing circuit coupled to the first communication interface and the second communication interface, the processing circuit configured to:
      operate in a first mode where the first communication interface is communicatively connected to the access point;
      send a request to the proxy device requesting it to operate as a proxy by monitoring a data channel for data messages intended for the client terminal and forwarding the data messages intended for the client terminal via the second communication interface, wherein data channel is different from signaling or control channels;
      operate in a second mode where the first communication interface is communicatively disconnected from the access point while the access point still believes that the client terminal is operating in the first mode; and
      monitor the second communication interface for the forwarded data messages from the proxy device.

2. The client terminal of claim 1, wherein the first communication interface has a longer range than the second communication interface.

3. The client terminal of claim 1, wherein the first communication interface has a greater bandwidth than the second communication interface.

4. The client terminal of claim 1, wherein at least one of the first communication interface and the second communication interface is a wireless communication interface.

5. The client terminal of claim 1, wherein the first mode the client terminal monitors the data channel for data messages via the first communication interface.

6. The client terminal of claim 1, wherein the second mode the data channel is unmonitored by the client terminal.

7. The client terminal of claim 1, wherein the first communication interface is a Code Division Multiple Access (CDMA)-compliant interface and the second communication interface is any Bluetooth compliant interface.

8. The client terminal of claim 1, wherein processing circuit is further configured to:
   determine whether the client terminal should switch from the first mode to the second mode; and
   switch from the first mode to the second mode if inactivity on the first communication interface exceeds a threshold amount of time.

9. The client terminal of claim 1, wherein the processing circuit is further configured to:
   receive a forwarded data message from the proxy device via the second communication interface.

10. The client terminal of claim 9, wherein the processing circuit is further configured to:
    determine whether the client terminal should switch from the second mode to the first mode after receiving the forwarded data message; and
    switch to the first mode if additional data messages are expected over the data channel.

11. The client terminal of claim 9, wherein the processing circuit is further configured to:
    send an acknowledge message via the second communication interface to the proxy device.

12. The client terminal of claim 9, wherein the processing circuit is further configured to:
    receive a wake-up signal from the proxy device, the wake-up signal indicating that data messages for the client terminal will be forthcoming over the data channel; and
    switch to the first mode as a result of the wake-up signal.

13. A method operational on a client terminal comprising:
    operating the client terminal in a first mode where a first communication interface is communicatively connected to an access point;
    sending a request to a proxy device requesting it to operate as a proxy by monitoring a data channel for data messages intended for the client terminal and forwarding the data messages intended for the client terminal via a second communication interface, wherein the data channel is different from signaling or control channels, and the fist communication interface has a longer range than the second communication interface;
    operating in a second mode where the first communication interface is communicatively disconnected from the access point while the access point still believes that the client terminal is operating in the first mode; and monitoring the second communication interface for the data messages from the access point that have been forwarded by the proxy device.

14. The method of claim 13, further comprising:
determining whether the client terminal should switch from the first mode to the second mode; and
switching from the first mode to the second mode if inactivity on the first communication interface exceeds a threshold amount of time.

15. The method of claim 13, further comprising:
receiving a forwarded data message from the proxy device via the second communication interface.

16. The method of claim 13, further comprising:
determining whether the client terminal should switch from the second mode to the first mode after receiving the forwarded data message; and
switching to the first mode if additional data messages are expected over the data channel.

17. The method of claim 13, further comprising:
receiving a wake-up signal from the proxy device, the wake-up signal indicating that data messages for the client terminal will be forthcoming over the data channel; and
switching to the first mode as a result of the wake-up signal.

18. The method of claim 13, wherein the request includes a client terminal identifier, a channel identifier, and one or more decoding parameters for the data channels.

19. The method of claim 13, further comprising:
receiving an acknowledgment reply from the proxy device indicating that it is acting as a proxy for the client terminal.

20. The method of claim 13, wherein the first mode is a connected mode within a Radio Resource Control as defined by a Universal Mobile Telecommunications System (UMTS) standard.

21. The method of claim 20, wherein the connected mode uses at least one of a Cell Dedicated Channel (Cell_DCH), a Cell Forward Access Channel (Cell_FACH), a Cell Paging Channel (Cell_PCH), and UMTS Terrestrial Radio Access Network (UTRAN) Registration Area Paging Channel (URA_PCH).

22. The method of claim 13, wherein the second mode is a disconnected mode or idle mode within a Radio Resource Control as defined by a Universal Mobile Telecommunications System (UMTS) standard.

23. The method of claim 13, wherein the first mode is a connected mode within an Evolution Data Only (EVDO) standard, where the connected mode is an active mode.

24. The method of claim 13, wherein the second mode is a disconnected mode within an Evolution Data Only (EVDO) standard, where the disconnected mode is at least one of a suspended mode, an idle mode, a sleep mode, and an off mode.

25. A client terminal comprising:
means for operating in a first mode where the first communication interface is communicatively connected to the access point;
means for sending a request to the proxy device requesting it to operate as a proxy by monitoring a data channel for data messages intended for the client terminal and forwarding the data messages intended for the client terminal via a second communications interface, wherein the data channel is different from signaling or control channels, and the first communication interface has a longer range than the second communication interface;
means for operating in a second mode where the first communication interface is communicatively disconnected from the access point while the access point still believes that the client terminal is operating in the first mode; and
means for monitoring the second communication interface for forwarded data messages from the proxy device.

26. A non-transitory processor-readable medium having one or more instructions operational on a client terminal for conserving power at the client terminal, which when executed by a processor causes the processor to:
operate in a first mode where a first communication interface is communicatively connected to an access point;
send a request to a proxy device requesting it to operate as a proxy by monitoring a data channel for data messages intended for the client terminal and forwarding the data messages intended for the client terminal via a second communication interface, wherein the data channel is different from signaling or control channels, and the first communication interface has a longer range than the second communication interface;
operate in a second mode where the first communication interface is communicatively disconnected from the access point while the access point still believes that the client terminal is operating in the first mode; and
monitor the second communication interface for the forwarded data messages from the proxy device.

27. A proxy device, comprising:
a first communication interface for wirelessly communicating with an access point;
a second communication interface for wirelessly communicating with a client terminal, wherein the first communication interface has a longer range than the second communication interface;
a processing circuit coupled to the first communication interface and the second communication interface, the processing circuit configured to:
receive a request from the client terminal to operate as a proxy for the client terminal operating in a first mode, wherein the client terminal is communicatively connected to an access point;
monitor for data messages on a data channel for the client terminal via the first communication interface; wherein the data channel is different from signaling or control channels; and
send a received data message to the client terminal via the second communication interface, wherein the client terminal is operating in a second mode where the client terminal is communicatively disconnected from the access point while the access point still believes that the client terminal is operating in the first mode.

28. The proxy device of claim 27, wherein the first communication interface has a longer range than the second communication interface.

29. The proxy device of claim 27, wherein at least one of the first communication interface and the second communication interface is a wireless communication interface.

30. The proxy device of claim 27, wherein the first communication interface is a Code Division Multiple Access (CDMA)-compliant interface and the second communication interface is any Bluetooth compliant interface.

31. The proxy device of claim 27, wherein the processing circuit is further configured to:
add the client terminal to a proxy list; and
send an acknowledgment reply to the client terminal accepting the request.

32. The proxy device of claim 27, wherein the processing circuit is further configured to:
remove the client terminal from a proxy list after the data message is sent to the client terminal.

33. The proxy device of claim 27, wherein the processing circuit is further configured to:
translate the data message from a first communication protocol associated with the first communication interface to a second communication protocol associated with the second communication interface.

34. The proxy device of claim 27, wherein the request from the client terminal includes a client terminal identifier, a data channel identifier, and one or more decoding parameters for the data channel associated with the client terminal.

35. The proxy device of claim 27, wherein the processing circuit is further configured to:
receive an acknowledge message via the second communication interface in response to sending the data message to the client terminal; and
forward the acknowledge message to the access point via the first communication interface.

36. The proxy device of claim 27, wherein the processing circuit is further configured to:
determine whether additional data messages are imminent after receiving the data message for the client terminal; and
send a wake-up signal from the proxy device if it is determined that additional data messages are imminent.

37. A method operational on a proxy device, comprising:
receiving a request from a client terminal to operate as a proxy for the client terminal operating in a first mode, wherein the client terminal is communicatively connected to an access point;
monitoring for data messages from the access point on a data channel for the client terminal via a first communication interface, wherein the data channels is different from signaling or control channels; and
sending a received data message to the client terminal via a second mode via a second communication interface, while the client terminal is communicatively disconnected from the access point while the access point still believes that the client terminal is operating in the first mode,
wherein the first communication interface has a longer range than the second communication interface.

38. The method of claim 37, further comprising:
translating the data message from a first communication protocol associated with the first communication interface to a second communication protocol associated with the second communication interface.

39. The method of claim 37, wherein the first communication interface consumes more power than the second communication interface for a given data message size.

40. The method of claim 37, wherein the proxy device operates as a proxy for a plurality of client terminals by monitoring data channels associated with the plurality of client terminals.

41. The method of claim 37, further comprising:
receiving an acknowledge message via the second communication interface in response to sending the data message to the client terminal; and
forwarding the acknowledge message to the access point via the first communication interface.

42. The method of claim 37, further comprising:
determining whether additional data messages are imminent after receiving the data message for the client terminal; and
sending a wake-up signal from the proxy device if it is determined that additional data messages are imminent.

43. The method of claim 37, further comprising:
adding the client terminal to a proxy list; and
sending an acknowledgment reply to the client terminal accepting the request.

44. The method of claim 37, wherein the access point believes that the client terminal is operating in a connected mode within a Radio Resource Control as defined by a Universal Mobile Telecommunications System (UMTS) standard.

45. The method of claim 44, wherein the connected mode uses at least one of a Cell Dedicated Channel (Cell DCH), a Cell Forward Access Channel (Cell_FACH), a Cell Paging Channel (Cell_PCH), and UMTS Terrestrial Radio Access Network (UTRAN) Registration Area Paging Channel (URA_PCH).

46. The method of claim 44, wherein the client terminal is in fact operating in a disconnected mode or idle mode within a Radio Resource Control as defined by a Universal Mobile Telecommunications System (UMTS) standard.

47. The method of claim 37, wherein the access point believes that the client terminal is operating in a connected mode as defined in an Evolution Data Only (EVDO) standard, where the connected mode is an active mode.

48. The method of claim 47, wherein the client terminal is in fact operating in a disconnected mode within an Evolution Data Only (EVDO) standard, where the disconnected mode is at least one of a suspended mode, an idle mode, a sleep mode, and an off mode.

49. A proxy device, comprising:
means for receiving a request from the client terminal to operate as a proxy for the client terminal operating in a first mode, wherein the client terminal is communicatively connected to an access point;
means for monitoring for data messages from the access point on a data channel for the client terminal via a first communication interface, wherein the data channel is different from signaling or control channels; and
means for sending a received data message to the client terminal operating in a second mode via a second communication interface, while the client terminal is communicatively disconnected from the access point while the access point still believes that the client terminal is operating in the first mode,
wherein the first communication interface has a longer range than the second communication interface.

50. A non-transitory process-readable medium having one or more instructions operational on a proxy device for facilitating power conservation in client terminals, which when executed by a processor causes the processor to:
receive a request from the client terminal to operate as a proxy for the client terminal operating in a first mode, wherein the client terminal is communicatively connected to an access point;
monitor for data messages from the access point on a data channel for the client terminal via a first communication interface, wherein the data channel is different from signaling or control channels; and
send a received data message to the client terminal operating in a second mode via a second communication interface, while the client terminal is communicatively disconnected from the access point while the access point still believes that the client terminal is operating in the first mode, wherein the first communication interface has a longer range that the second communication interface.

* * * * *